United States Patent [19]
Kim

[11] Patent Number: 5,892,932
[45] Date of Patent: *Apr. 6, 1999

[54] REPROGRAMMABLE SWITCHING APPARATUS AND METHOD

[75] Inventor: Hyong S. Kim, Pittsburgh, Pa.

[73] Assignee: FORE Systems, Inc., Warrendale, Pa.

[*] Notice: This patent issued on a continued prosecution application filed under 37 CFR 1.53(d), and is subject to the twenty year patent term provisions of 35 U.S.C. 154(a)(2).

[21] Appl. No.: 561,365

[22] Filed: Nov. 21, 1995

[51] Int. Cl.$^6$ ................................... G06F 13/00
[52] U.S. Cl. ........................ 395/311; 395/312; 370/369
[58] Field of Search ................................... 395/311, 312, 395/200.15, 182.02, 287, 200.62, 200.68; 340/825.79, 825.85; 370/53, 54, 58.1, 59, 352, 369, 386, 427

[56] References Cited

U.S. PATENT DOCUMENTS

| | | | |
|---|---|---|---|
| 3,890,469 | 6/1975 | Kelly et al. | 370/369 |
| 3,999,162 | 12/1976 | Le Roy | 395/311 |
| 4,058,672 | 11/1977 | Crager et al. | 370/394 |
| 4,201,890 | 5/1980 | Lawrence et al. | 370/362 |
| 4,901,309 | 2/1990 | Turner | 370/387 |
| 5,113,390 | 5/1992 | Hayashi et al. | 370/352 |
| 5,274,782 | 12/1993 | Chalasani et al. | 395/311 |
| 5,351,146 | 9/1994 | Chan et al. | 359/118 |
| 5,396,638 | 3/1995 | Kanekura | 395/377 |
| 5,404,537 | 4/1995 | Olnowich et al. | 370/388 |
| 5,440,550 | 8/1995 | Follett | 370/427 |
| 5,455,917 | 10/1995 | Holeman et al. | 395/287 |
| 5,530,814 | 6/1996 | Wong et al. | 395/312 |
| 5,539,621 | 7/1996 | Kikinis | 361/803 |

*Primary Examiner*—Gopal C. Ray
*Attorney, Agent, or Firm*—Ansel M. Schwartz

[57] ABSTRACT

There is shown an apparatus for switching. The apparatus for switching comprises L switching modules which switch packets, where $L \geq 2$ and is an integer. In an embodiment, each of the L switching modules switch packets independent of any other switching module such that there is distributed switching of packets across the L switching modules. The apparatus also comprises an interconnection module which is connected to each of the L switching modules. The interconnection module that provides a passive backplane provides connectivity between the L switching modules. In an embodiment, the interconnection module provides space and time multiplexed connectivity between the L switching modules. In an other embodiment, the interconnection module is expandable without a priori knowledge of a final number of switching modules. In yet another embodiment, the interconnection module is reprogrammable in regard to connectivity between the L switching modules. The present invention pertains to a method for creating a switching apparatus. The method comprises the steps of connecting a first and at least a second switching module to an interconnection module. Next, there is the step of programming the interconnection module to create a desired connectivity between the first and second switching modules to the interconnection module. Then, there is the step of transferring a packet through the interconnection module and first and second switching modules. Then, there is the step of connecting at least one additional switching module to the interconnection module. Next, there is the step of reprogramming the interconnection module to create a desired connectivity between the first, second and third switching modules to the interconnection module. The present invention pertains to a method of directing a packet.

19 Claims, 18 Drawing Sheets

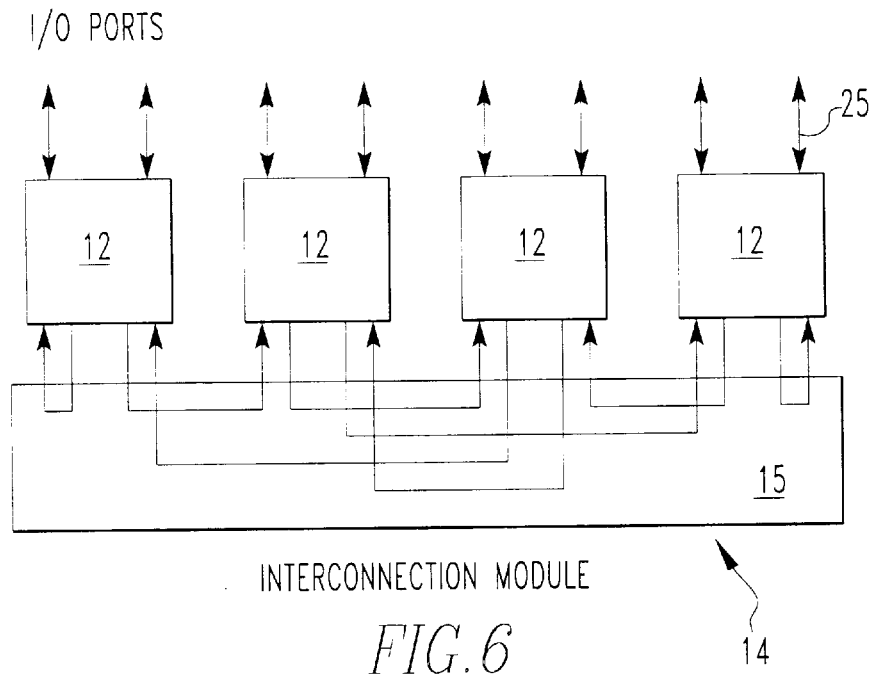
FIG. 6
FIG. 8

CYCLE 1

CYCLE 2

CYCLE 3

EXAMPLE OF BINARY ROUTING

AFFECTED IMAP PARTS    INTERCONNECTION MODULE

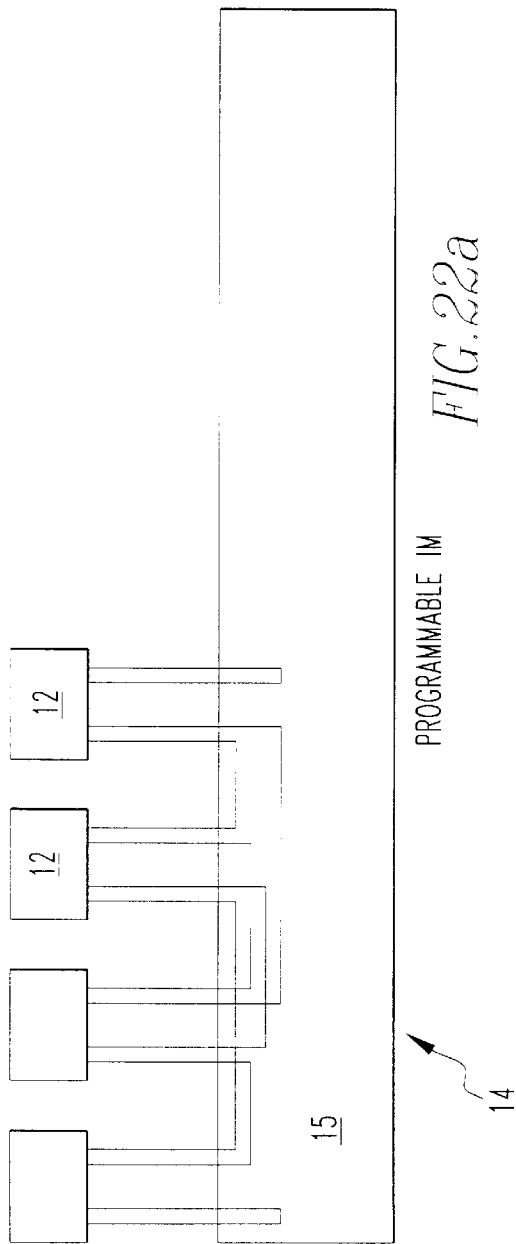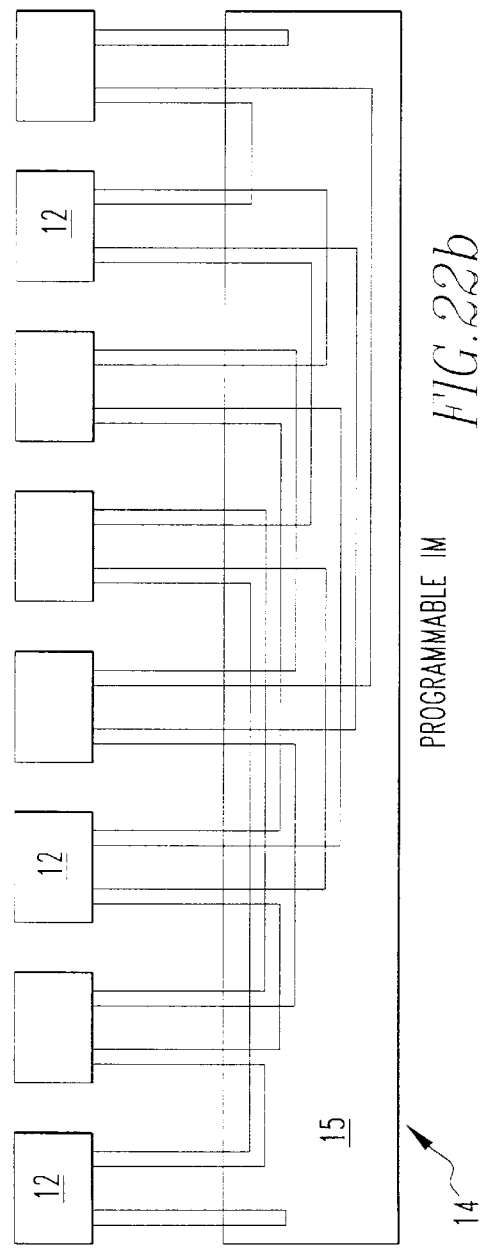

REPROGRAMMABLE SWITCHING APPARATUS AND METHOD

FIELD OF THE INVENTION

The present invention relates to a switch and a method for directing packets. More specifically, the present invention relates to a switch which is reprogrammable in regard to connectivity between switching modules, has distributed control and is expandable without a priori knowledge of a final number of switch modules.

BACKGROUND OF THE INVENTION

As the internet traffic increases and becomes diverse due to upcoming applications such as the WWW (world wide web), the demand for ATM packet,switches, such as ATM switches, is expected to increase. The current standard for high performance packet switches is ATM. There currently is a lot of hype in the ATM market. However, when the dust settles, customers will clearly see that the current ATM products will be inadequate for several reasons. These products do not truly offer modularity and scalability in terms of performance nor cost. An ideal ATM switch would allow customers to buy a small sized switch initially and increase its size as the need arises without making the previous installation obsolete or making a significant initial investment with an eye toward expansion later. The present invention is a novel packet switch architecture to provide these customers with what they want now: a switch that can grow economically without compromising network performance nor control complexity.

The migration of high bandwidth connections from local area networks to larger networks has increased the size requirements of ATM (Asynchronous Transfer Mode) switches. Current ATM switch products in the market are limited in their scalability, typically due to the high access rates required to a shared buffer memory and the complex interconnections between switching elements.

Existing ATM switch architectures increase their switch size by interconnecting multiple ports by a time-multiplexed bus. Thus the number of ports in these switches are limited by the bandwidth of the backbone bus. Furthermore, the speed of switch controller increases with the size of the switch. In addition to limited scalability, it is typically difficult to grow the switch in a modular fashion. For example, if a customer plans to deploy a 128 ported ATM switch in the future, then it is necessary to purchase the 128 ported switch frame and backbone bus and then purchase additional I/O cards as the need arises. Thus the initial cost to the customer is very high and the size of the final switch size is determined in the initial stage of switch deployment. Current ATM switch products do not offer a clear evolutionary path to large scale switches from current small sized switches. Either customers have to waste initial investment or plan ahead and make major investment in the beginning. Even then they do not offer scalability after one reaches the maximum size of the switch.

There are several advantages of the proposed switch architecture herein. First of all, the proposed switch is truly scalable and modular. A customer can start with as low as a 16 ported switch at the competitive price and grow up to 2048 ported switch without major modification of already invested components. The cost of expanding to a larger switch is linear and the switch does not require a major investment initially. The switch architecture consists of multiple switching modules that are interconnected by a simple and low cost space and time-multiplexed backplane. The major cost of the switch is in the switching modules and the low-cost backplane is reconfigured automatically as the size of the switch grows. The size of the switch can grow simply by adding additional switching modules to existing ones without a priori knowledge of the final size. switching modules are then interconnected via a low-cost programmable backbone, IM (Interconnection Module). The low-cost IM contains no active components and consists of passive elements. IM can be either replaced for the desired switch size at low cost or reprogrammed for additional switching modules if a larger IM was installed initially. Thus the size of the switch can be increased without early decision of what final switch size should be.

Another major advantage of the switch is its robust performance and ability to handle heterogeneous traffic efficiently. The queueing discipline employed in the switch is partially shared buffering. The switch shares a subset of the entire memory space and at the same time it ensures fair access to every user in a heterogenous traffic scenario. Existing shared-memory switches are shown to be biased toward users with heavy traffic load and degrade services to lightly loaded traffic due to memory hogging problems. Thus, a complex control structure is required in existing shared-memory switches to avoid traffic congestion and unfair accesses. Another critical advantage of the switch is its distributed control. The switch has a distributed control and the complexity of control does not grow with the size of the switch. In existing switches, a centralized controller switches packets from input ports to output ports. Furthermore, the speeds of the processor and the memory have to increase in order to accommodate larger number of ports. In the switch architecture of the present invention, each switching module operates independent of the states of other switching modules no matter how many of them are present. Each switch module processes incoming packets using their destination address. Thus, the switching module needs to accommodate packets from its own fixed number of input ports. The speed of the control processor and memory in each switching module does not increase as the size of the switch increases. Distributed control is a major advantage of any scalable architecture due to speed limitation on processors and memory. Furthermore, the cost of implementing a distributed control which requires low speed parts is far lower than a centralized control with high speed components.

The proposed switch architecture consists of multiple switching modules that are interconnected by a simple and low cost space and time-multiplexed backplane. The major cost of the switch is in the switching modules. The low-cost backplane is reconfigured automatically as the size of the switch grows. Each switching module contains an internal buffer that is shared among other switching modules. This switch architecture provides connectivity among different switching modules through a combination of space and time division multiplexing. The intelligent routing of cells through these switching modules allow high throughput and low delay performance comparable to more expensive output queueing switches under random traffic. Under bursty and non-uniform traffic, the switch automatically reconfigures and manages buffers to avoid performance degradation that are inherent in existing switch architectures without complex buffer control mechanisms. Furthermore, multicast traffic can be easily accommodated and is routed efficiently to maximize switch utilization.

Another way to view the switch architecture of the present invention is that it provides scalability through space division switching in conjunction with the time division switching. Switching modules are configured through multiple backbone buses and interconnected in various ways to achieve a desired performance. Switching modules can be interconnected in a symmetric fashion to achieve the minimum hop delay for balanced traffic as discussed below as modulo T design. However, these switching modules can also be configured to take advantage of different traffic requirements. In a client-server traffic scenario, more bandwidth can be allocated among heavily used switching modules thus resulting in an asymmetric configuration. Since the backbone interconnection is programmable, the switch can adapt to different traffic patterns to meet the required performance using the same hardware elements.

SUMMARY OF THE INVENTION

There is shown an apparatus for switching. The apparatus for switching comprises L switching modules which switch packets, where L≧2 and is an integer. In an embodiment, each of the L switching modules switch packets independent of any other switching module such that there is distributed switching of packets across the L switching modules.

The apparatus also comprises an interconnection module that provides a passive which is connected to each of the L switching modules. The interconnection module provides connectivity between the L switching modules. In an embodiment, the backplane of the interconnection module provides space and time multiplexed connectivity between the L switching modules. In an other embodiment, the interconnection module is expandable without a priori knowledge of a final number of switching modules. In yet another embodiment, the interconnection module is reprogrammable in regard to connectivity between the L switching modules.

The present invention pertains to a method for creating a switching apparatus. The method comprises the steps of connecting a first and at least a second switching module to a passive backplane of an interconnection module. Next, there is the step of programming the interconnection module to create a desired connectivity between the first and second switching modules through the backplane of the interconnection module. Then, there is the step of transferring a packet through the backplane of the interconnection module and first and second switching modules. Then, there is the step of connecting at least one additional switching module to the backplane of the interconnection module. Next, there is the step of reprogramming the interconnection module to create a desired connectivity between the first, second and third switching modules through the backplane of the interconnection module.

The present invention pertains to a method of directing a packet.

BRIEF DESCRIPTION OF THE DRAWINGS

In the accompanying drawings, the preferred embodiment of the invention and preferred methods of practicing the invention are illustrated in which:

FIG. 6 is a schematic representation of a binary interconnection scheme.

FIG. 8 is a schematic representation of a packet overhead format.

FIGS. 22a and 22b are schematic representations of a scaling 8×8 switch to a 16×16 switch using the programmable interconnection module.

DESCRIPTION OF THE PREFERRED EMBODIMENT

Figure 2:
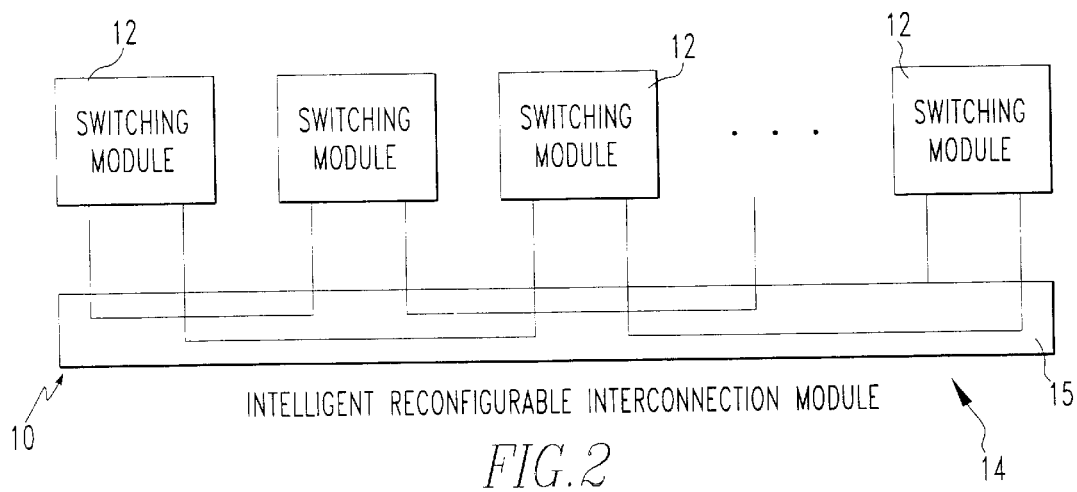
FIG. 2 is a schematic representation of an architecture of the present invention.

Referring now to the drawings wherein like reference numerals refer to similar or identical parts throughout the several views, and more specifically to FIG. 2 thereof, there is shown an apparatus 10 for switching. The apparatus 10 for switching comprises L switching modules 12 which switch packets, where L≧2 and is an integer. In an embodiment, each of the L switching modules 12 switch packets independent of any other switching module 12 such that there is distributed switching of packets across the L switching modules 12. That is, each switching module operates on packets it receives separate from what any other switching module is doing.

The apparatus 10 also comprises an interconnection module 14 that provides a passive backplane 15 which is connected to each of the L switching modules 12. The backplane 15 of the interconnection module 14 provides connectivity between the L switching modules 12. In an embodiment, the backplane 15 of the interconnection module 14 provides space and time multiplexed connectivity between the L switching modules 12. In an other embodiment, the interconnection module 14 is expandable without a priori knowledge of a final number of switching modules 12. In yet another embodiment, the interconnection module 14 is reprogrammable in regard to connectivity between the L switching modules 12.

Preferably, the interconnection module 14 is scalable. Each switching module 12 preferably has m I/O ports 15 for user connections, where m≧2 and is in integer and where each I/O port 15 has a speed, and T interconnection module access ports 16 for interconnection module 14 connections, where T≧2 and is an integer.

Figure 4:
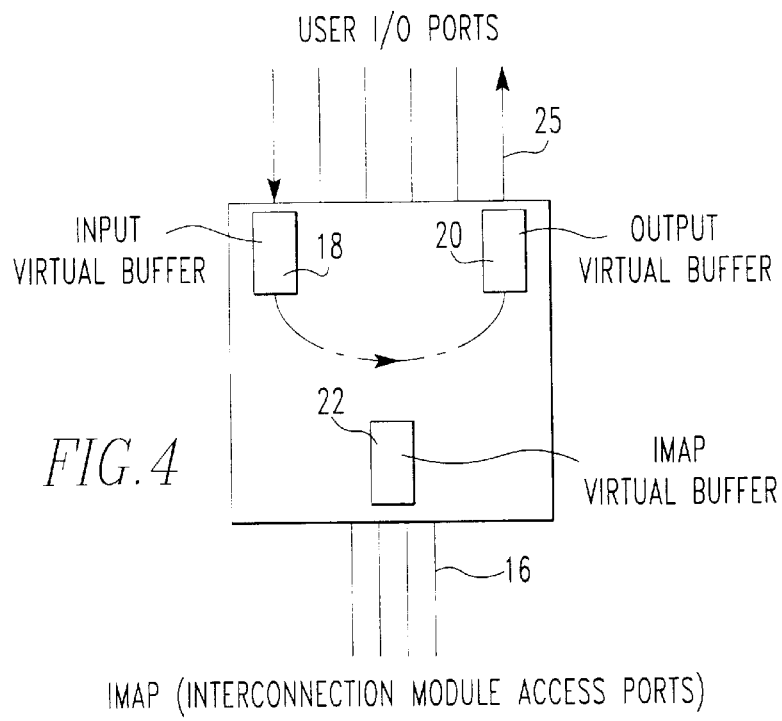
FIG. 4 is a schematic representation of intra switching module communications.

Referring to FIG. 4, each switching module 12 preferably also has a buffer memory. Preferably, the buffer memory is comprised of an input buffer 18 memory and an output buffer 20 memory which are connected to the I/O ports 15 and an interconnection module access port buffer memory 22 connected to the interconnection module access ports 16. Preferably, the interconnection module access ports 16 operate at a speed of S, where S≧Speed of each I/O port 15. Each switching module 12 preferably includes a fair queue.

Preferably, the interconnection module 14 causes a packet to reach a desired I/O port 15 in a maximum of $\log_T N$ hops. The number of interconnection module access ports 16 preferably corresponds to how a packet is routed by the switching modules 12 and the interconnection module 14 to a desired destination. The switching modules 12 and interconnection module 14 preferably operate in modulo T. Each switching module 12 and the interconnection module 14 are preferably able to multicast packets.

Figure 16:
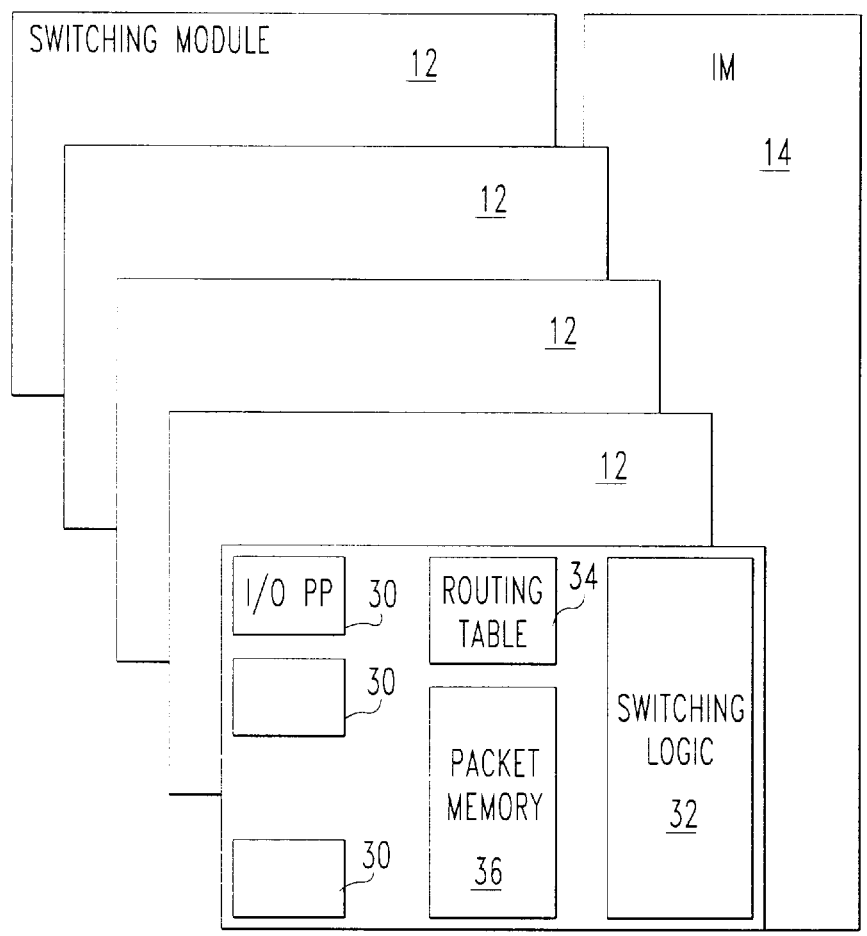
FIG. 16 is a schematic representation of an overall switch diagram.

The apparatus 10 preferably includes an I/O packet processor 30, as shown in FIG. 16, which synchronizes and checks for errors in incoming packets. The I/O packet processor 30 is connected to each switching module 12. The apparatus 10 preferably also includes a switch controller 32 which establishes connectivity in at least one switching module 12 so a packet can reach a desired destination.

Each switching module 12 preferably has a routing table 34 which provides logical channel translation such that a destination address of a packet is decoded so connectivity can be properly established in the switching module 12. Additionally, each switching module 12 preferably has a packet memory 36 for buffering packets.

The present invention pertains to a method for creating a switching apparatus 10. The method comprises the steps of connecting a first and at least a second switching module 12 to an interconnection module 14. Next, there is the step of programming the interconnection module 14 to create a desired connectivity between the first and second switching modules 12 to the interconnection module 14. Then, there is the step of transferring a packet through the interconnection module 14 and first and second switching modules 12. Then, there is the step of connecting at least one additional switching module 12 to the interconnection module 14. Next, there is the step of reprogramming the interconnection module 14 to create a desired connectivity between the first, second and third switching modules 12 to the interconnection module 14.

Figure 7:
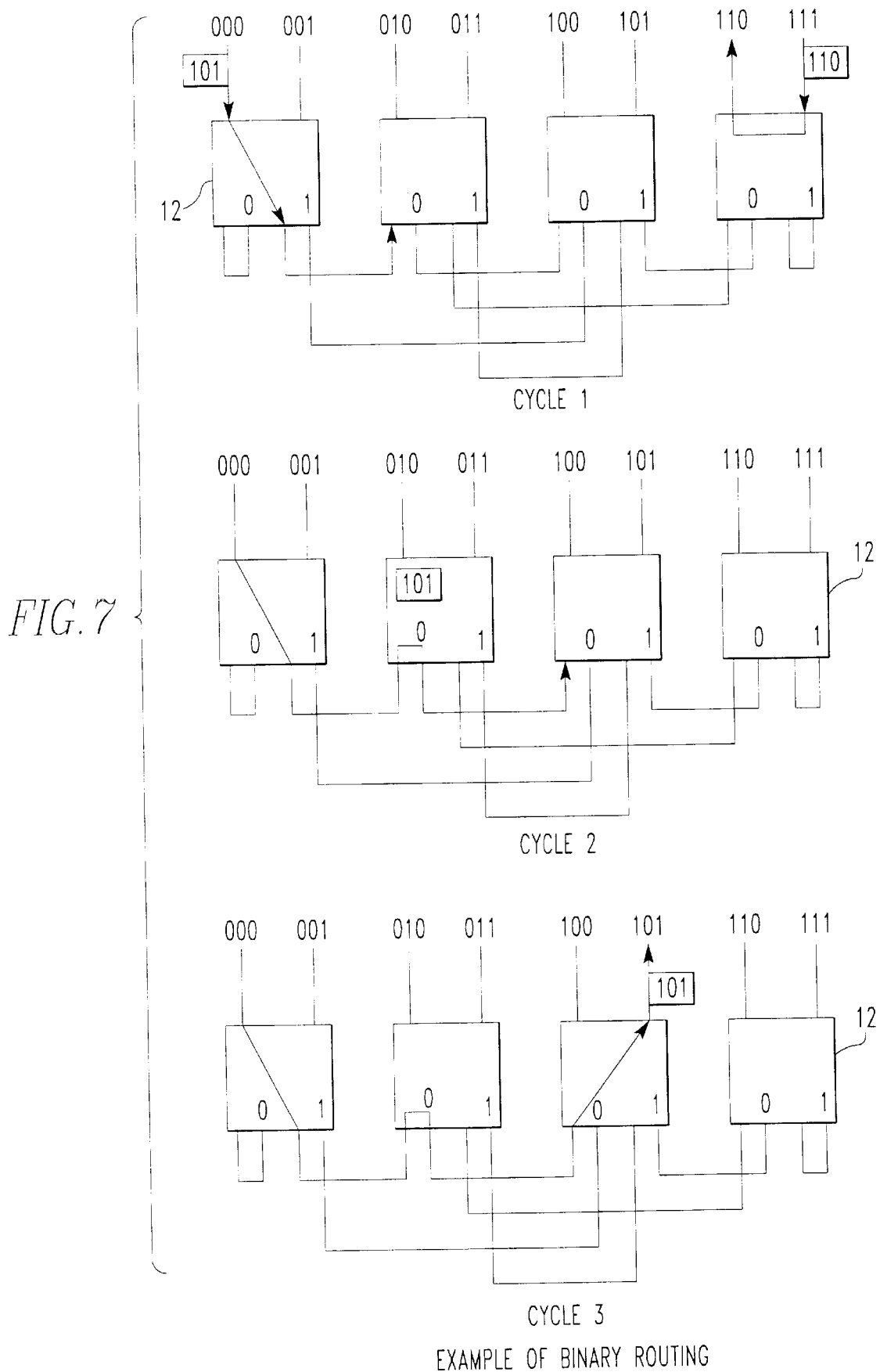
FIG. 7 is a schematic representation of an example of binary routing.
Figure 9:
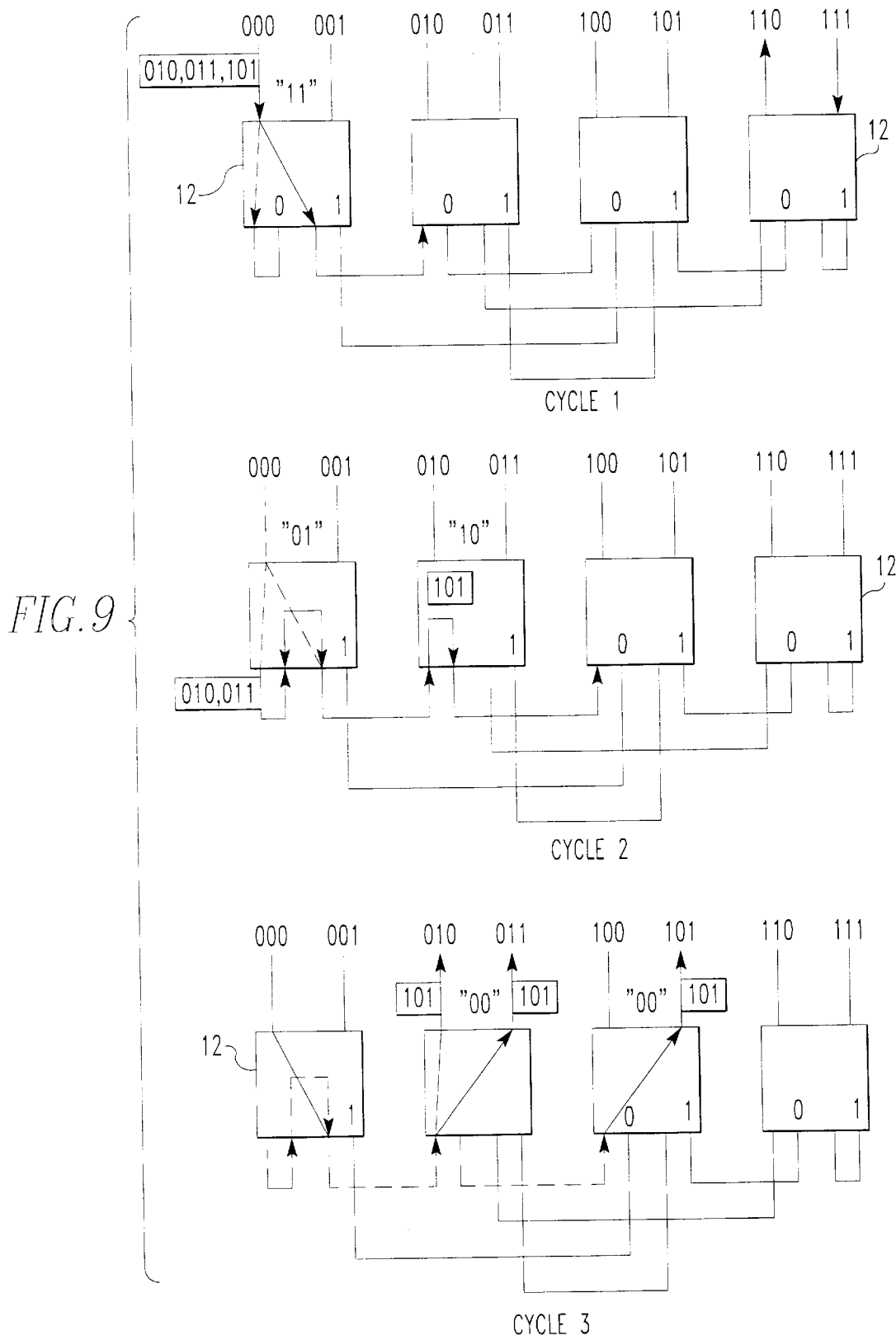
FIG. 9 is a schematic representation of a multicast virtual circuit set-up phase.
Figure 10:
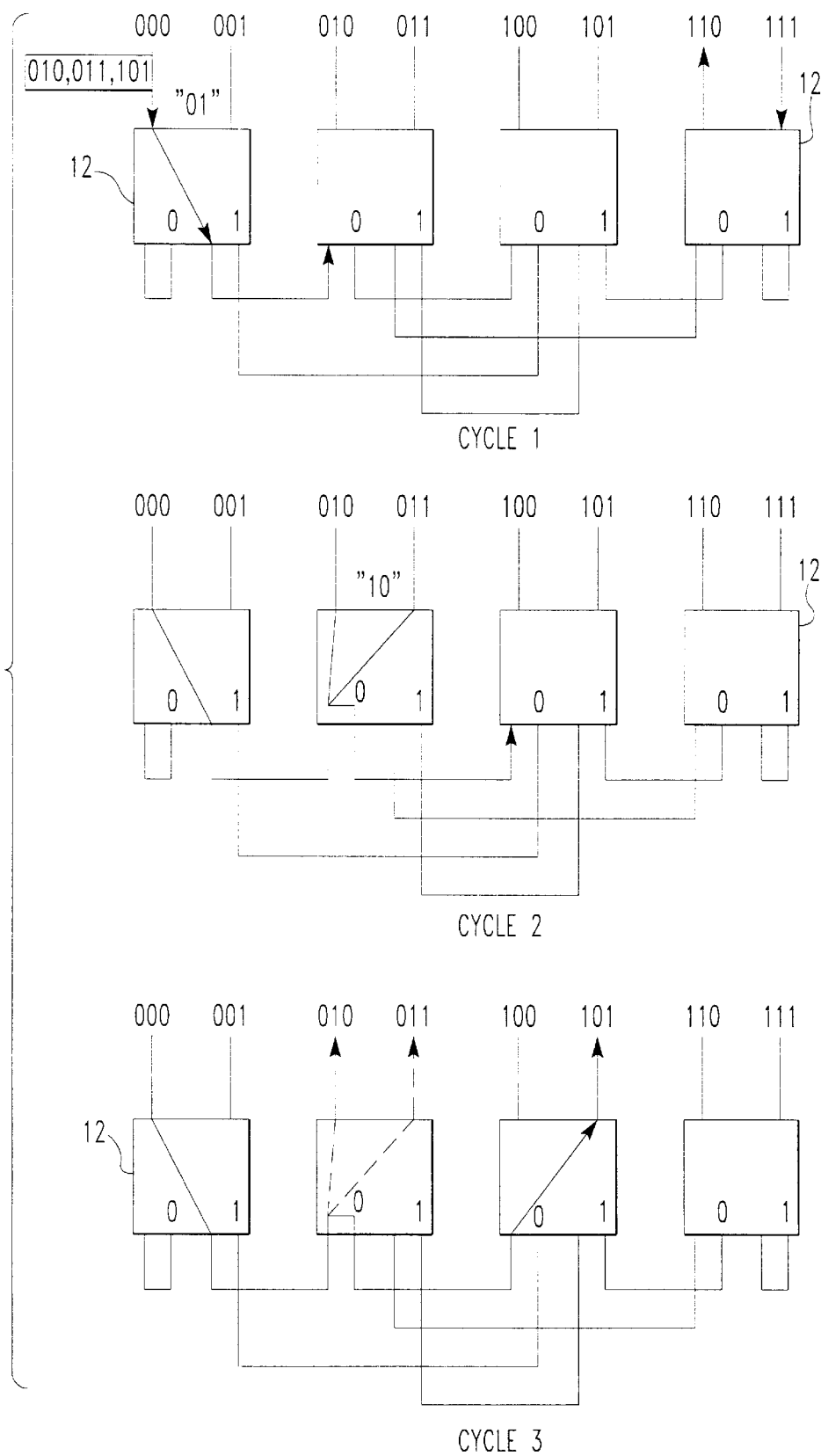
FIG. 10 is a schematic representation of an example of multicast routing.

Referring to FIGS. 7, 9 and 10 for exemplary purposes, the present invention pertains to a method of directing a packet. The method comprises the steps of incrementing a packet having a destination address and a counter bit into a first switching module 12. Next, there is the step of checking whether the destination address of the packet is at the first switching module 12. Then, there is the step of reading the counter bit. Next, there is the step of reading the ith bit of the destination address. The ith bit corresponds to the counter bit, where I≧1 and is an integer. Next, there is the step of sending the packet out a port of the switching module 12 whose value corresponds to the value of the ith bit. Then, there is the step of transferring the packet to a second switching module 12 through an interconnection module 14. Next, there is the step of incrementing the counter bit by 1. Then, there is the step of searching for the destination address until it is found.

The present invention pertains to a method of directing a packet. The method comprises the steps of inputting a packet having a plurality of destination addresses defined by address bits, a counter bit, and a decision code into a first switching module 12. Next, there is the step of checking whether any of the destination addresses of the packet are at the first switching module 12. Then, there is the step of reading the counter bit. Next, there is the step of reading the ith bit of the destination addresses. The ith bit corresponds to the counter bit, where I≧1 and is in integer. Then, there is the step of setting the decision code of the cell to correspond to the ith bit of the destination addresses bits. Next, there is the step of sending the packet out each port of the switching module 12 whose value corresponds to the decision code. Then, there is the step of transferring the packet to a second switching module 12 through an interconnection module 14. Next, there is the step of incrementing the counter bit by 1. Then, there is the step of checking whether any of the destination addresses of the packet are at the second switching module 12. Next, there is the step of reading the counter bit. Then, there is the step of reading the ith+1 bit of the destination addresses bits. Next, there is the step of sending the decision code of the cell to correspond to the ith+1 bit of the destination address bits. Then, there is the step of searching for the destination addresses until they are found.

Figure 1:
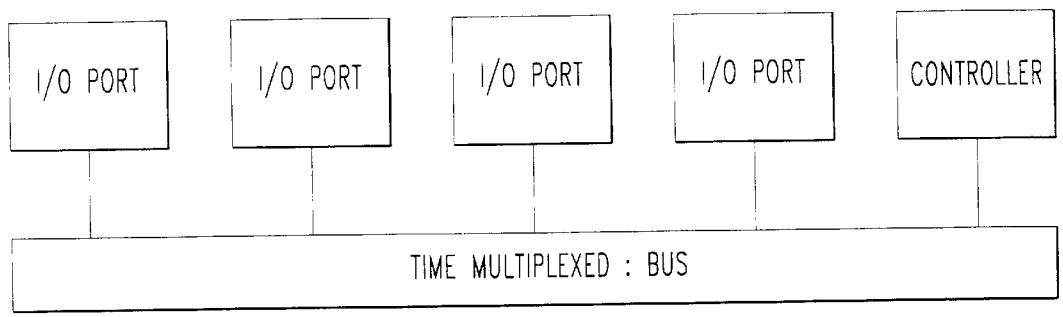
FIG. 1 is a schematic representation of a conventional bus-based architecture.

In regard to the operation of the invention, conventional bus-based switch architectures involving ATM interconnect the switching elements through a time-multiplexed backbone bus as shown in FIG. 1. When a port is accessing the bus either to read or write a cell, the entire bus is dedicated to that particular port and other ports wait for their turn. Thus, in a cyclical fashion, each port accesses the bus to switch cells to their proper destination port. The bus bandwidth is required to be N times the speed of each input port. The apparatus 10 differs significantly from the bus-based architecture and utilizes an intelligent interconnection module 14 based on a space and time multiplexing scheme. The key elements of the apparatus 10 are the intelligent interconnection module 14 and the distributed control algorithm. Furthermore, the interconnection module 14 reconfigures automatically according to the number of ports 16 and desired performance.

FIG. 2 illustrates the overall architecture of the apparatus 10. Arbitrary sized switching modules 12 are interconnected by the reconfigurable interconnection module. Incoming packets are switched locally within the switching module if the desired connection is between the ports within the same switching module. If an incoming packet is destined to the ports in other switching modules, it is switched to the appropriate switching module through the interconnection module according to the routing algorithm. The cell may require one or multiple hops to reach its destination. The apparatus 10 is controlled by a distributed routing algorithm that guarantees the number of hops required to reach the destination is small. The maximum number of hops depends on the dimensioning and the configuration of the apparatus 10. Details of the routing algorithm are discussed below.

Figure 3:
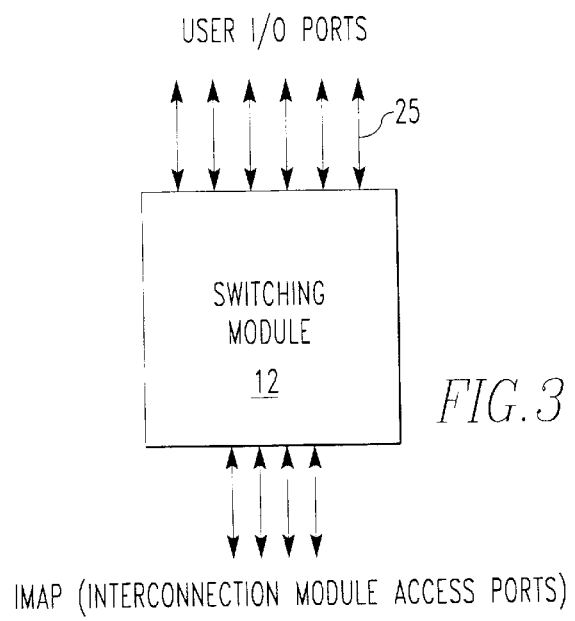
FIG. 3 is a schematic representation of a switching module.

The switching module (SM) 12 can be of an arbitrary switch architecture with input and output ports. The switching module has I/O ports for user connections and interconnection module access ports (IMAP) as shown in FIG. 3. There are 3 virtual buffer memories in the switching module: Input buffers 18, output buffers 20, and IMAP buffers 22.

For local communication (i.e. intra SM 12 connections), incoming cells are switched from I/O ports to I/O ports via input and output buffers 20. If there is a sufficient number of available output ports, packets bypass the buffers and are switched out instantaneously. However, if there are multiple packets destined to the same I/O port, exceeding packets are stored in the output buffer 20 to be switched out at a later cycle.

Figure 5:
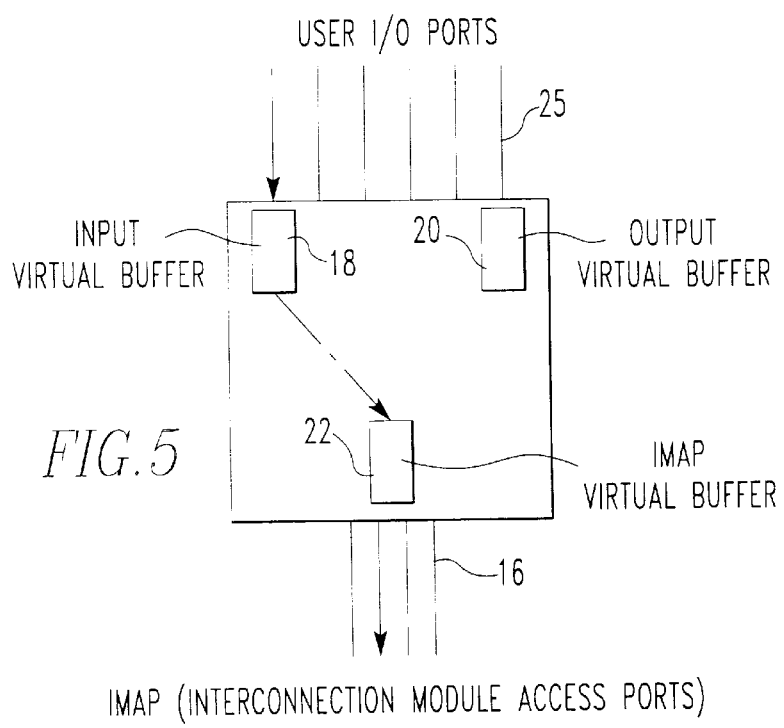
FIG. 5 is a schematic representation of inter switching module communications.

For inter-SM 12 communications, incoming cells are switched from I/O ports to the IMAPs to reach other switching modules via the interconnection module. An algorithm for inter-SM 12 routing is discussed below. FIGS. 4 and 5 show the operations of the intra and inter SM 12 communications, respectively. Let m be the number of IMAPs or an aggregate bandwidth of the IMAPs assuming each link has the same bandwidth as the input port. m determines the throughput of the IMAPs and the overall switch performance. The IMAP bandwidth can be implemented in various ways. There could be exactly m links running at the same speed as the input port or there could be k links running at the m/k times the speed of the input port. Thus, the interconnection module could provide a hybrid space and time multiplexed interconnection for switching modules.

The interconnection module provides a passive backplane for switching modules. This could be easily implemented by an I/O intensive FPGA. There is no logic or delay requirements needed for the interconnection module and only pin connectivity is required. The interconnection module could then be implemented simply using a single programmable chip that reconfigures when the size of the switch changes. The reconfiguration algorithm is implemented according to the routing algorithm that is discussed below.

The routing algorithm is distributed among switching modules. The complexity of the algorithm is constant regardless of the size of the switch and allows scalable switch architecture. The routing algorithm minimizes the number of hops and avoids congestion in the network. First, consider a binary routing algorithm which can be generalized further. Assume that each switching module has two inputs, two outputs, and two IMAP ports. The switching modules are interconnected in the pattern shown in FIG. 2. The given pattern guarantees that incoming cells will be routed to the destination port with the maximum of $\log_2 N$ hops where N is the total number of I/O ports.

The unicast routing operation of the apparatus 10 is as follows. Each incoming packet has a destination port address that is $\log_2 N$ bits (i.e. d1,d2,d3 with N=8). The packet also has a hop counter, $i_h$, initialized to 1. Each switching module first checks whether the destination address of the packet matches either of its I/O ports. If the destination address matches the I/O ports, the switching module sends out the packet to the appropriate I/O port or stores the packet in the output buffer 20 if that I/O port is busy. If the destination address does not matches either of its I/O ports, then it checks the $i_h$th bit of the destination address and switches the packet out to the IMAP port "0" or IMAP port "1" if the $i_h$th bit is "0" or "1" respectively. FIG. 7 shows the binary routing algorithm. Assume that there is one packet destined to output port 5 (101) at input port 0 (000) and one packet destined to output port 6 (110) at input port 7 (111). In the first cycle, input port 7 switches out the packet (110) to the output port 6 (110) since the destination address matches the output port 6. Thus, packet (110) is switched out in the first cycle without going through IMAP ports. Input port 0 sends packet (101) to IMAP port "1" since the first bit is "1" ($i_h$=1). The switching module also increments the hop counter by 1 ($i_h$=2). In the second cycle, the second switching module switches out to IMAP "0" since the $i_h$th bit ($i_h$=2) of the destination address is "0" and the packet reaches the third switching module. In the third cycle, the packet is finally switched out to the output port 5 since its destination address matches the output port 5.

It is easily proven that the maximum number of hops each packet takes to get to the destination port is $\log_2 N$ ($\log_2 8=3$ in the example). However, packets usually take much less than the maximum number of hops to reach their destination port. It is possible that multiple packets try to access the same output port or the same IMAP port at the same time. In order to avoid the performance degradation due to port contention, the IMAP port speed needs to be increased slightly, either by using a higher clock speed or wider data path. As shown later, it is only necessary to increase the speed by a small constant to reach the performance of output queueing switches that require a speed up factor of N. Thus, the speed of the switch does not increase with N to provide desired performance. Packet sequence is also maintained in the switch since cells belonging to the same packet stream take the same path through the switch.

Multicast routing of cells in the switch is a simple extension of the unicast routing algorithm. The routing information in the header requires a bit indicating whether the packet is a multicast or unicast packet. If the multicast bit is set, then the following field is used as a multicast identifier as shown in FIG. 8. If the multicast bit is "0", then the unicast address bits are used according to the unicast routing scheme discussed above. If the multicast bit is "1", then the switching module follows the multicast routing algorithm according to the control information obtained from the table lookup memory. When the virtual circuit is being set-up, an entry into the memory of each switching module is made to indicate the proper output port. For example, the entry in the memory could indicate that the incoming packet for a particular virtual circuit has to be switched to an output port and to a particular IMAP port simultaneously. In the case of the binary routing algorithm, any multicast routing can be carried out by establishing a binary spanning tree. Each &witching module maps the multicast identifier to a two bit decision code. The decision code "01" indicates that the packet should be switched to IMAP port "1". "10" indicates that the packet should be switched to IMAP port "0". "11" indicates that the packet should be switched to both IMAP ports.

FIG. 9 illustrates the set-up of an entry in the lookup table. Assume that there is a packet destined to ports "010", "011", and "101" at input port "0". In the first cycle, the switching module checks the first bits of the destination addresses. If they are all "1" or all "0", then the decision code is set to "101" or "10" respectively. If they contain both "1" and "0", then the decision code is set to "11". In this example, the first module sets the decision code to be "11" at the first cycle and "010,011" are sent to the IMAP "0" and "101" is sent to the IMAP "1". In the second cycle, the first module now checks the second bits of the destination address "010,011". Since both bits are "1", the decision code is set to "01" and both packet addresses are sent to the IMAP 1. The second switching module checks the second bit of the destination address "101". The decision code is set to "10" and the switching module sends "101" to the IMAP "0" since the second bit is "0". In the third cycle, the packet addresses "010,011" match the output port addresses of the switching module and the decision code is set to "00" to indicate that packets are sent to the output ports. The packet address "101" also matches the output port address and the decision code is set to "00" to indicate that the packet is sent to the output port. The multicast routing patterns are set up using the simple distributed control algorithm as explained. However there is a more efficient way of multicasting by combining multiple cycles to a single one if the same path can be shared. For instance, the packet "010,011" is also directed to the second switching module via IMAP "1" as the packet "101" only at a cycle later. There is no need to delay the "010,011" packet and this operation can be combined at the first cycle for more efficient multicasting. This efficient multicasting is illustrated in the next example.

Different decision codes are found during the virtual circuit set-up phase and are stored in switching modules according to multicast connection pattern. FIG. 10 shows an example of multicast routing in the apparatus 10. Assume that input port "0" has a multicast packet with destination addresses "010", "011", and "101". The decision code at the first switching module has been set up as "01" at the virtual circuit set up phase and it switches the packet to the IMAP port 1. In the second cycle, the decision code at the second switch module is "10" and the packet is switched out to the IMAP port 0 and to both output port "010" and "011". In the third cycle, the packet is switched out to the output port "101" and the multicasting of the packet is completed. The advantage of using the decision code for multicasting is the simplicity and flexibility of traffic management. It comes at the cost of an additional lookup table memory. However, this additional memory for multicast routing is required for existing ATM switch products as well. In the apparatus 10, the additional memory represents only a small increment in hardware cost since the multicast decision routing is incorporated in the VC/VP table lookup memory. Thus, a few extra bits of multicast information are added to already existing VC/VP lookup memory in the switching module.

There are other ways to manage multicasting in the apparatus 10. For example, the destination port addresses can be carried in the header and can be decoded at each switching module to switch accordingly. However, this scheme becomes complex as the switch size and the multicast number increases. The apparatus 10 is flexible enough to adopt any other multicast scheme if the need arises.

So far, the operation and architecture of the apparatus 10 has been illustrated using a binary configuration and binary routing algorithms for sake of simplicity. The apparatus 10 can be generalized to accommodate more diverse switch dimensions and to satisfy different quality of services. Let N be the number of ports in the entire apparatus 10. Let M be the number of user I/O ports in each switching modules. Then, $$N = \sum_{\text{number of } SM} M.$$

Let T be the number of IMAP ports in the switching module. Assume that there are S switching modules. For example, IMAP i is connected to IMAP port $$\left( T \times \text{remainder} \left( \frac{i}{S} + k \text{ for } kS \leq i \leq (k+1)S - 1 \text{ where } 0 \leq k \leq T \right) \right)$$

for the minimum hop symmetric configuration.

Figure 11:
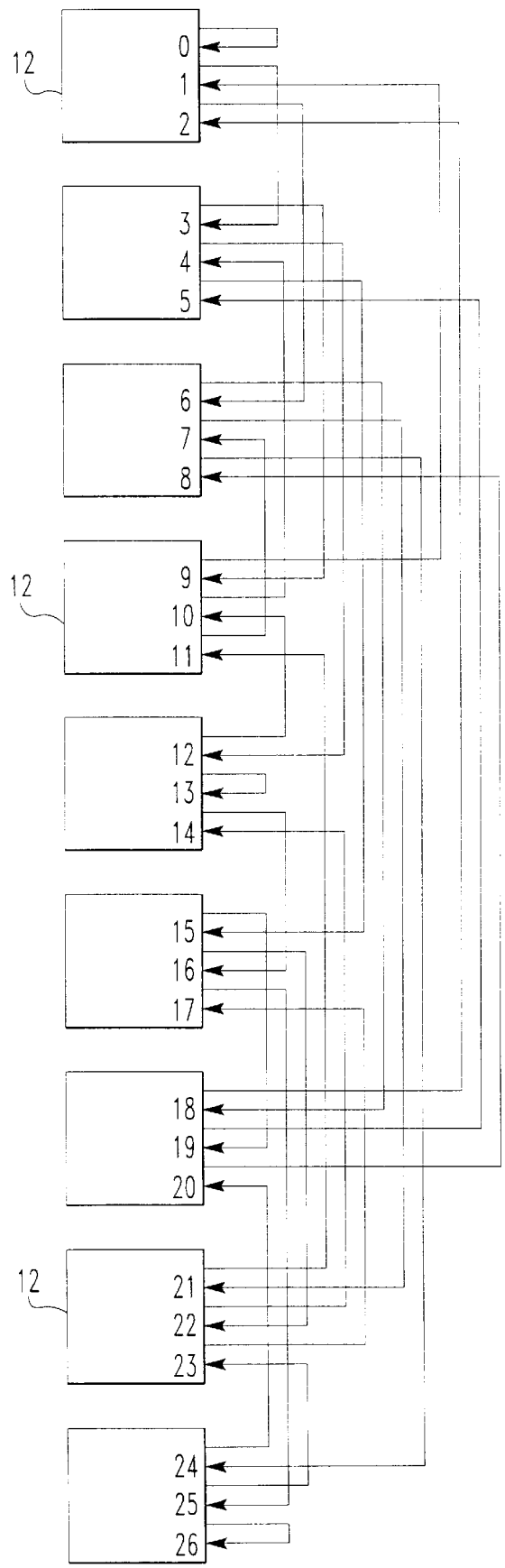
FIG. 11 is a schematic representation of a 27×27 switch configuration with T=3.

If T is 2, then the interconnection module configuration is binary and the routing is done according to the binary algorithm given in the previous section. If T is 3, then switching modules are interconnected according to a ternary scheme and the routing is controlled by a ternary algorithm. FIG. 11 shows a configuration of a 27 ported apparatus 10 when T is 3.

The routing of packets in the generalized architecture is similar to that of the binary routing algorithm. Instead of a binary numbering system, modulo T numbering is used for routing purposes. Each port is numbered according to modulo T numbering system and an arriving packet has a modulo T destination port address. In the first cycle, the switching module checks the first bit of the destination port and switches out to the IMAP with the same label as the destination bit. The concept of the distributed routing with modulo T addresses is the same as that of the binary algorithm as illustrated above.

Performance of the apparatus 10 is evaluated through computer simulations. Various performance parameters, such as the apparatus 10 throughput, delay, packet loss probability, are obtained through extensive simulations. Assume that the packet length is fixed (i.e. 53 bytes for ATM cell). Several traffic patterns are used to evaluate the switch performance. Random traffic is defined as a bernoulli process. In the bernoulli process, packets arrive at random and subsequent arrivals are independent. Furthermore, an arriving packet is equally likely to be destined to all output ports. Low rate data and voice can be simulated as the random traffic since the dependence among subsequent arrivals from the same source is low since the interval between these packets is fairly large. Another traffic pattern of interest is bursty traffic. In bursty traffic, packet arrivals are highly correlated. Thus, it is common to see a burst of packets arriving consecutively. The average length of the burst is distributed according to geometric distribution with an appropriate parameter to satisfy average rate and the mean burst length. The bursty arrival process is modelled by a Markovian process and simulated accordingly. The apparatus 10 performance is also evaluated under heterogeneous traffic pattern in which bursty traffic and random traffic are mixed to simulate mixture of different services.

Figure 12:
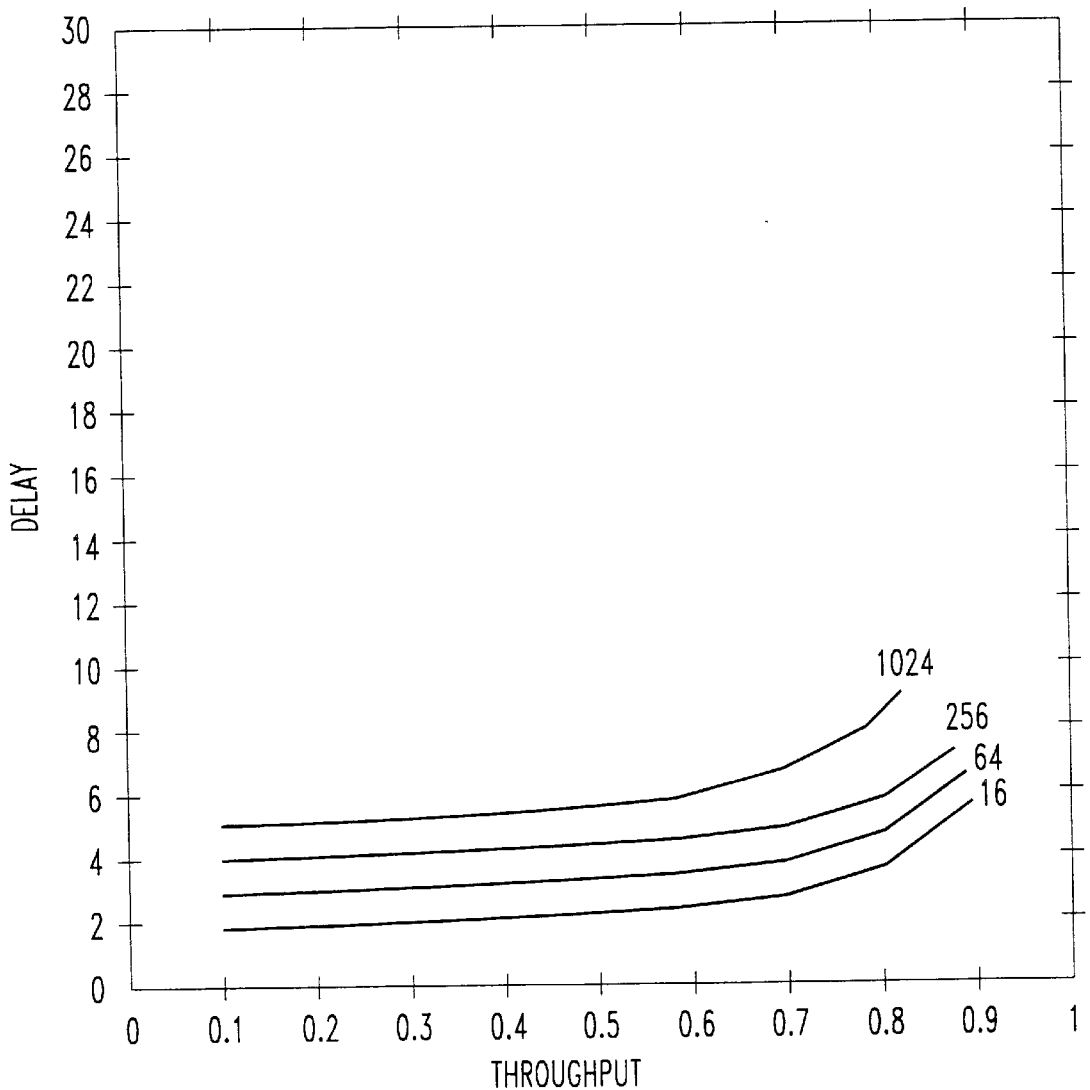
FIG. 12 is a performance graph of delay vs. throughput for 16×16, 64×64, 256×256, and 1024×1024 with 10 buffers per port with uniform traffic.

FIG. 12 shows the average packet delay vs. throughput curves for various switch sizes under random traffic. The average delay for 16×16, 64×64, 256×256, and 1024×1024 switch are around 2, 3, 4, and 5 respectively for up to 70% throughput. Even at the higher load of 90%, the average delay is less than 10 for given switch sizes.

Figure 13:
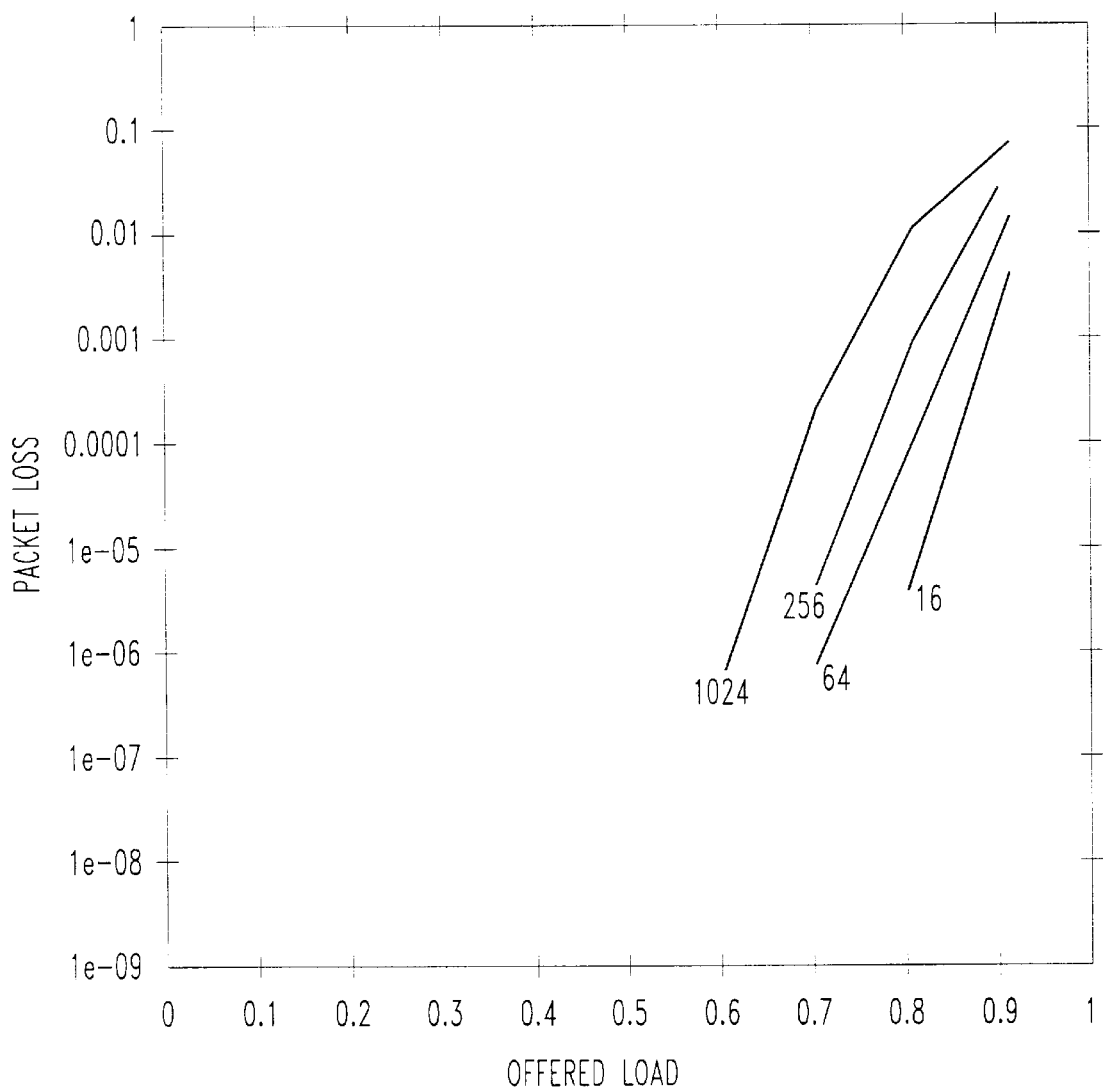
FIG. 13 is a performance graph of cell loss probability vs. offered load for 16×16, 64×64, 256×256, and 1024×1024 with 10 buffers per port with uniform traffic.

FIG. 13 shows the packet loss probability vs. offered load curves for various switch sizes under random traffic. The apparatus 10 has 10 packet buffers per port (i.e. approximately 540 bytes of memory for 10 ATM cells per port). Obviously, higher number of buffers could be used in the switch but it was limited to 10 buffers to obtain the simulation results in reasonable time frame. Higher number of buffers decreases the packet loss probability and thus increases the simulation time significantly. The figure should be used as a reference point to the switch performance. The packet loss probability is obtained for 16×16, 64×64, 256×

256, and 1024×1024 switches with speed up factor of 4. If the apparatus 10 is running at 155 Mbps, the speedup factor of 4 is definitely in the realm of practical implementation with CMOS technology. As the figure shows, the packet loss probability is less than $10^{-6}$ with the offered load of 0.6 (or switch utilization of 60% of the total capacity) for 1024× 1024 switch configuration. The packet loss probability is even lower for smaller size switches as shown in FIG. 13. These packet loss probability can be brought down even further by increase the number of buffers without affecting the hardware complexity significantly. Current ATM switch products have anywhere from 1,000 to 100,000 cell buffers per port to achieve the desired cell loss probability.

Figure 14:
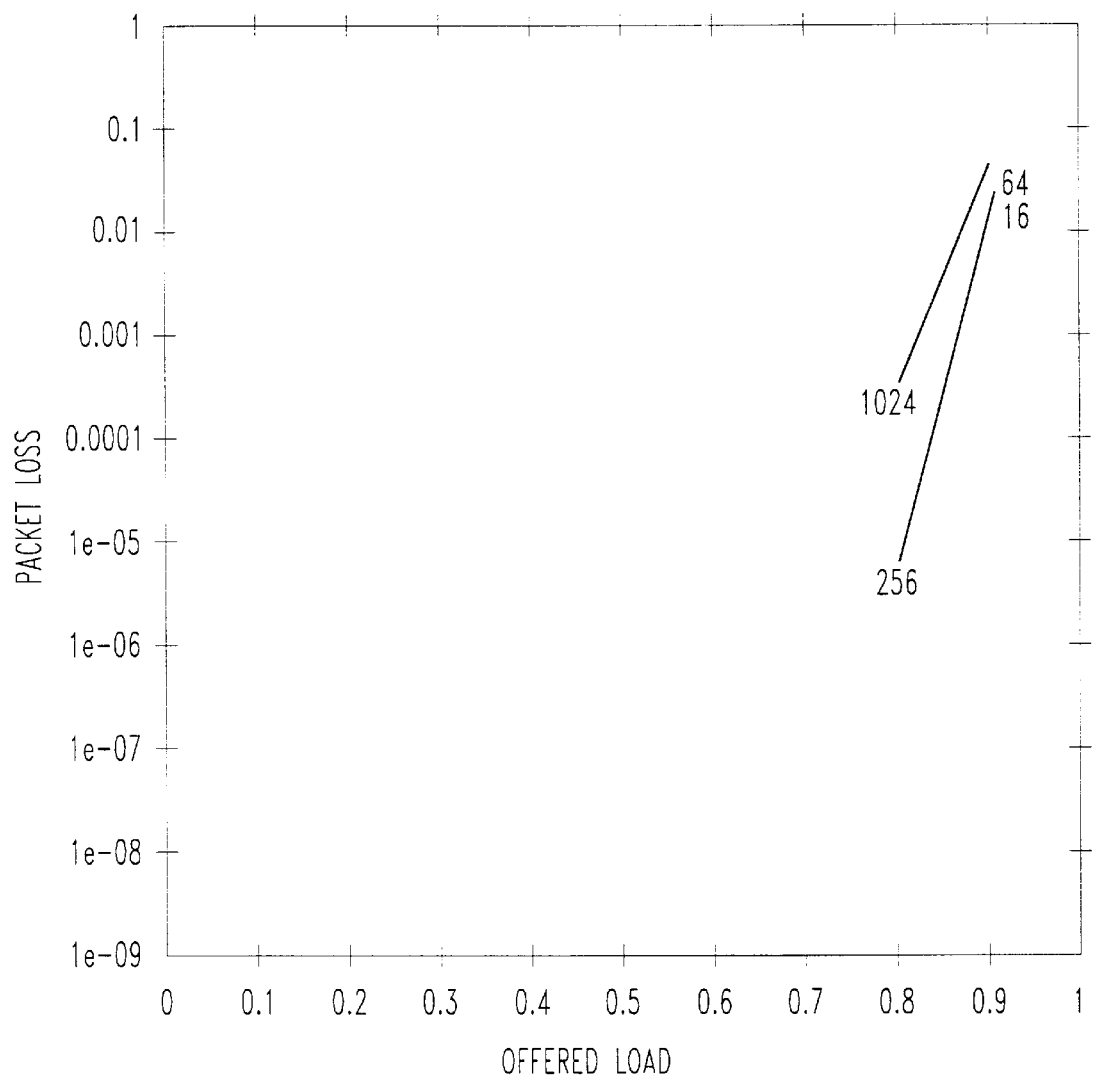
FIG. 14 is a performance graph of cell loss probability vs. offered load for 16×16, 64×64, 256×256, and 1024×1024 switch with 200 buffers under bursty traffic (burst length=8).
Figure 15:
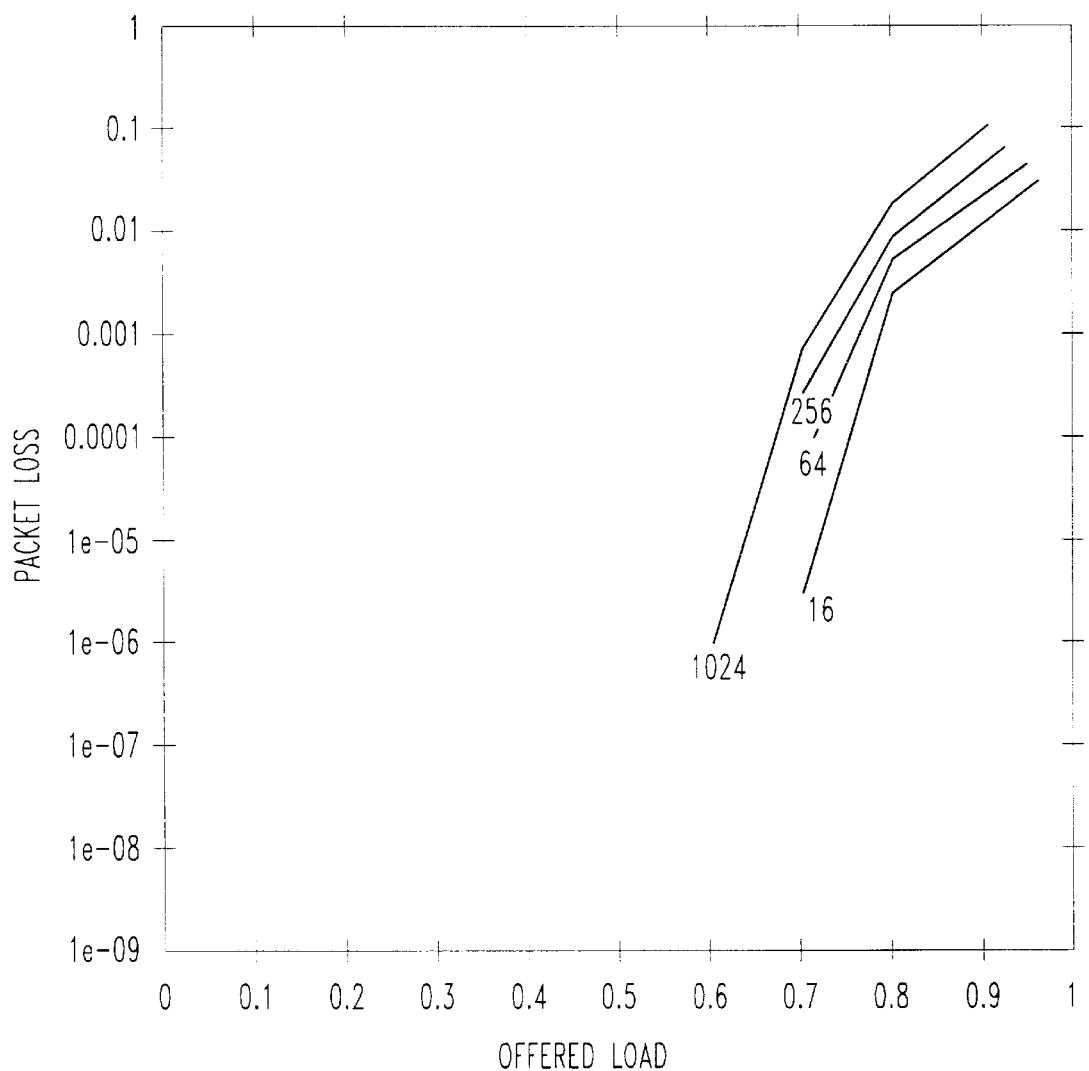
FIG. 15 is a performance graph of cell loss probability vs. offered load for 16×16, 64×64, 256×256, and 1024×1024 switch with 200 buffers under bursty traffic (burst length=20).

FIG. 14 and FIG. 15 show the packet loss probability vs. offered load for various switch size (from 16×16 to 1024× 1024) under bursty traffic with average burst length of 8 and 20 respectively. This traffic represent one of worst traffic patterns in the sense that every port is bursting packets through the switch at the same time. One may think of the scenario where every high speed user is bursting a file transfer at the same time. The apparatus 10 operates with reasonable loss even at the worst case scenario as shown in the figure. The apparatus 10 with the burst length of 8 out-performs the one with the burst length of 20 as expected. In FIG. 14, there is no packet loss incurred for switch size 16×16 and 64×64 at the load of 80% during the computer simulation. Twenty million packets were generated during the simulation.

Further computer simulation are carried out for mixed traffic with bursty and random traffic. Simulation results show that the packet loss probability decreases as the percentage of the bursty traffic decreases. An important observation from these results is that the packet loss probability is not impacted significantly by the traffic pattern. Thus, the apparatus 10 offers a robust performance under different mixture of traffic patterns. This property is very important to provide fair access to all paths. For instance, a user with highly bursty traffic could potentially degrade the performance of other users in completely shared-memory switches. These switches require complex buffer management mechanism to overcome such problems. Furthermore, they do not offer scalability provided in the apparatus 10 architecture.

An implementation example of the apparatus 10 configured in symmetric design with the binary routing algorithm is now given. The overall apparatus 10 consists of I/O packet processor 30, switch controller 32, switching module with routing table 34 and packet memory 36, and interconnection module as shown in FIG. 16. The packet processor 30 synchronizes and checks for errors in incoming packets and presents them to the apparatus 10. The routing table 34 provides logical channel translation such that the destination address of the packet is decoded for switching purposes. The packet memory 36 is used to buffer the packets in case of contention. Switching logic uses the decoded header information of packets to route accordingly. The switch controller 32 can be either embedded in the switching module or exist in a stand-alone module and it basically establishes the call when the connection request arrives.

Figure 17:
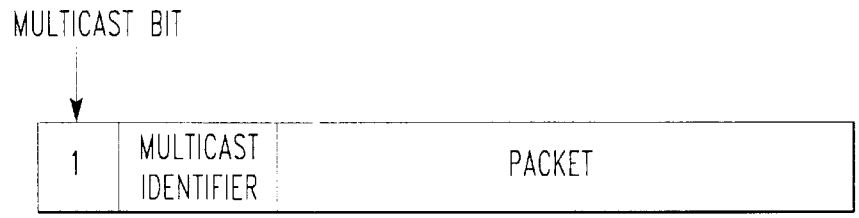
FIG. 17 is a schematic representation of a packet format.
Figure 18:
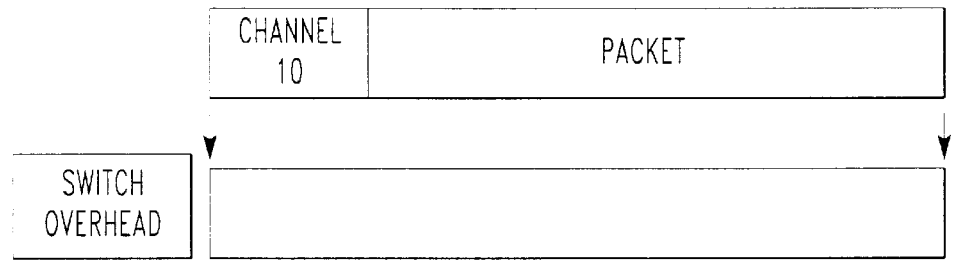
FIG. 18 is a schematic representation of a packet format with switch overhead.

Incoming packets include channel identification and unicast/multicast routing bit as overhead and information payload as shown in FIG. 17. When a packet arrives to an input port, the header information (channel id and unicast/multicast bit) is checked for a routing information in the routing table. Then, the overhead information is attached to the packet as shown in FIG. 18.

This overhead information is used by the switch logic to either send the packet to output ports of the switching module or to send it out to other switching modules via the interconnection module. For the binary routing scheme, the overhead consists of a hop counter and three bits to indicate whether the packet is going to particular output ports or IMAP ports. The first bit "1" indicates that the packet is destined to output ports and "0" indicates that the packet is destined to IMAP ports. The second and third bits "01" indicates the lower port (lower output ports if the first bit is "1") and "10" indicates the upper port. "11" indicates that the packet is destined to both ports for multicast purpose. Although this notation is given for the binary routing algorithm, the notation can be generalized for modulo T design as well. After the packet overhead bits are obtained from the routing table 34, packets are switched according to the routing algorithm described above.

Figure 19:
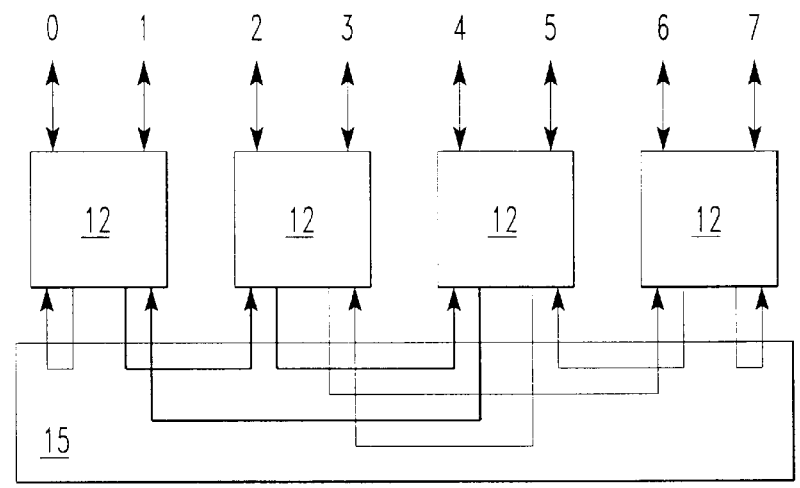
FIG. 19 is a schematic representation of an adaptable switch reconfiguration.

So far, the symmetric switch configuration for balanced traffic scenario has been discussed. The apparatus 10 can be reconfigured to take advantage of the programmability of the interconnection module. In a client-server model, a few ports may require high bandwidth I/O and may be highly utilized. In this case, the switch can be configured to minimize congestion and delay by providing higher bandwidth connectivity by reprogramming the IMAP and reducing the bandwidth of other modules. For example, an 8×8 switch (8 inputs, 8 outputs) with heavily loaded ports 1, 2, and 4 can be reconfigured as shown in FIG. 19. Thicker lines indicate higher bandwidth connections than thinner lines with lower bandwidth connections. Thus, ports 1, 2, and 4 obtain higher throughput with lower delay.

Figure 20:
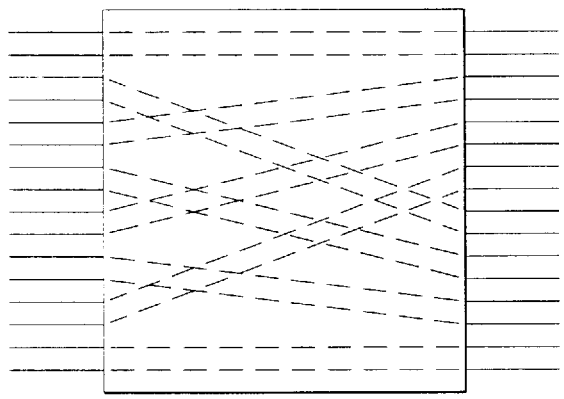
FIG. 20 is a schematic representation of an FPGA configuration.
Figure 21:
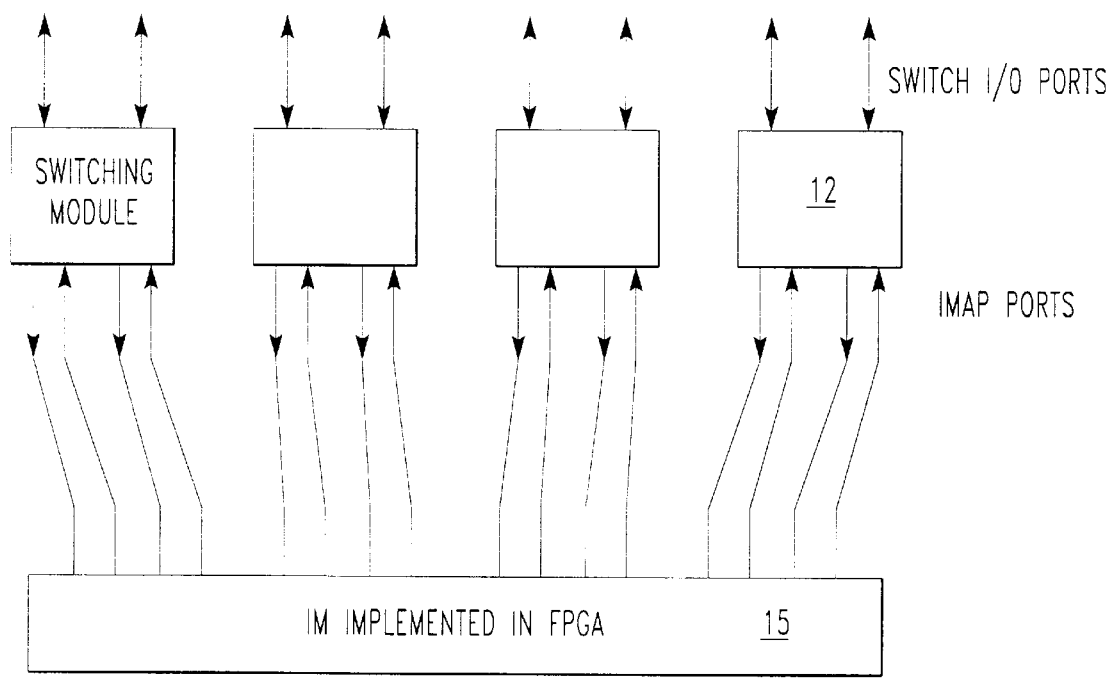
FIG. 21 is a schematic representation of an 8×8 switch implementation with a programmable IM.
Figure 24:
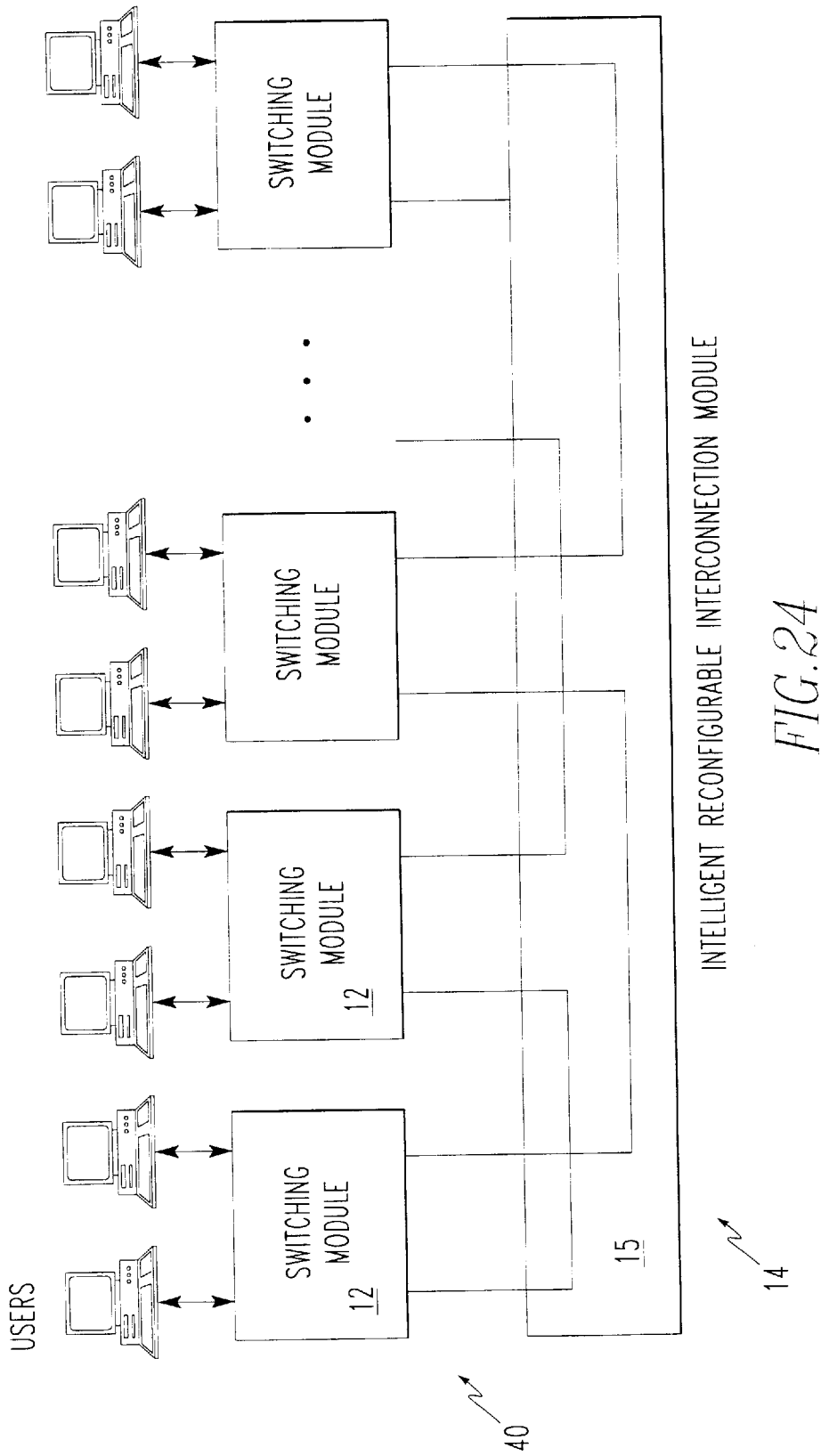
FIG. 24 is a schematic representation of an overall switching system.

The interconnection module can be implemented such that it can be reconfigured as the size of the apparatus 10 increases. An example of interconnection module implementation is discussed in this section. A programmable interconnection module consists of single or multiple FPGA (Field Programmable Gate Arrays) chips and is reprogrammed to an appropriate interconnection pattern as the size of the apparatus 10 increases. I/O ports of the FPGA chip can be programmed to establish desired connection patterns as shown in FIG. 20. For example, an 8×8 switch can be configured using a single FPGA and 4 switching modules with mod 2 configuration as shown in FIG. 21. As the switch size increases to 16×16, for example, from 4 switching modules, as shown in FIG. 22a, an additional 4 switching modules are added and the FPGA provides a desired connection pattern accordingly by reprogramming the FPGA parts. See FIG. 22b.

Figure 23:
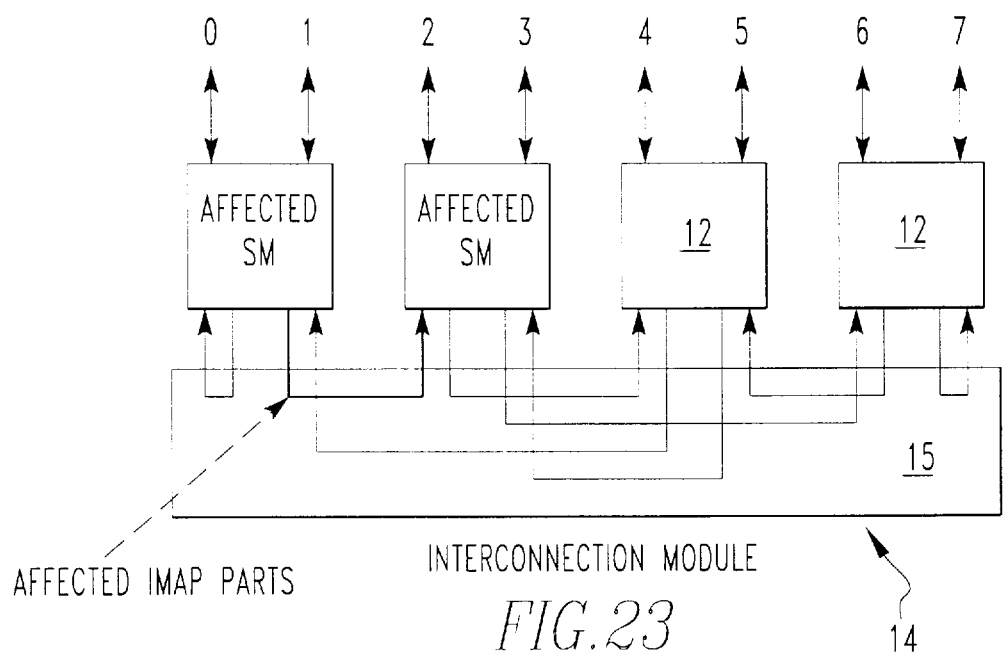
FIG. 23 schematic representation of an example of fair access.

The switch inherently provides fair access to the input ports. If a particular input-output connection is heavily loaded and causing congestion in the switch, it degrades performance of other input-output connection pairs that share the same path. However, other connection pairs are not affected by this congestion. Thus, the apparatus 10 isolates the congestion causing connection pair and prevents performance degradation of other connection pairs. FIG. 23 illustrates an example of fair access. If a connection from input port 1 to output port 2 is heavily loaded and starts to cause congestion in the apparatus 10, only those connections involving the first and second switching module are affected by the congestion. The remainder of the apparatus 10 is isolated from the congestion since not all connection pairs pass through the affected switching modules. Performance of connections in affected switching modules can be improved if necessary by adopting any well known fair buffering discipline, such as a fair queue, in the affected switching elements.

Arbitrary switch architectures can be used for the switching module 12 of the switching system 40, as shown in FIG.

Figure 25:
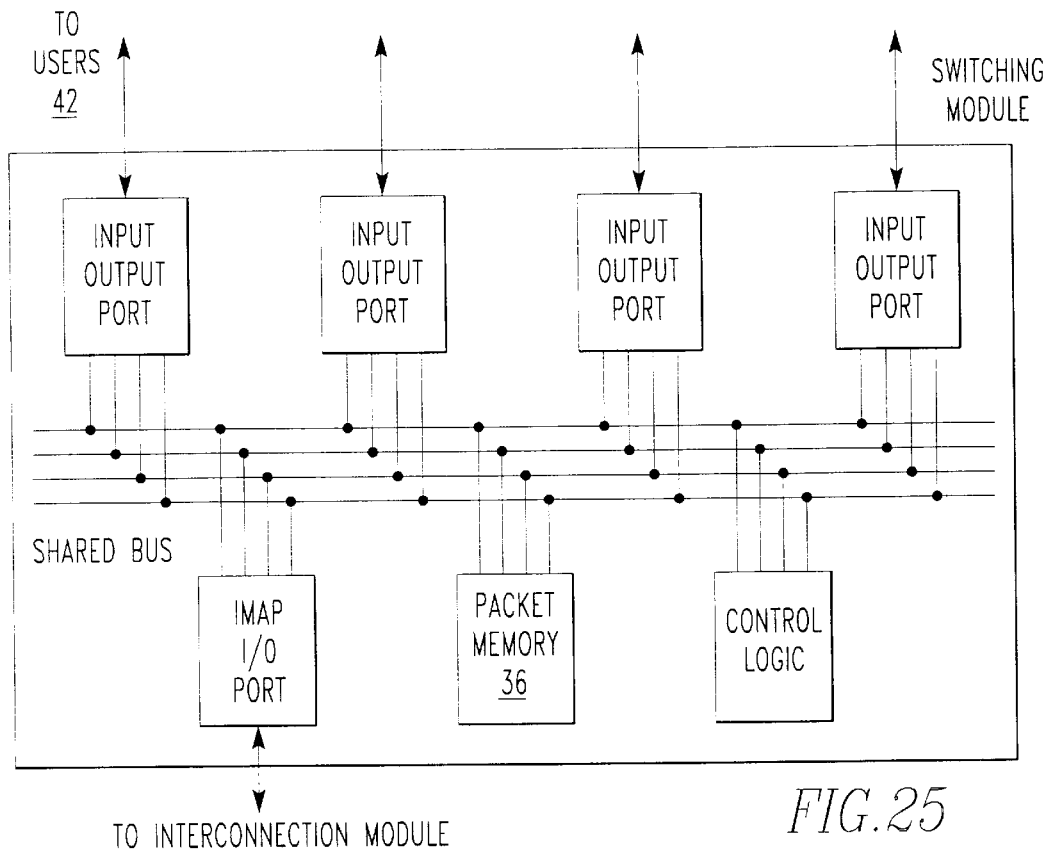
FIG. 25 is a schematic representation of a switching module based on bus-based switch architecture.
Figure 26:
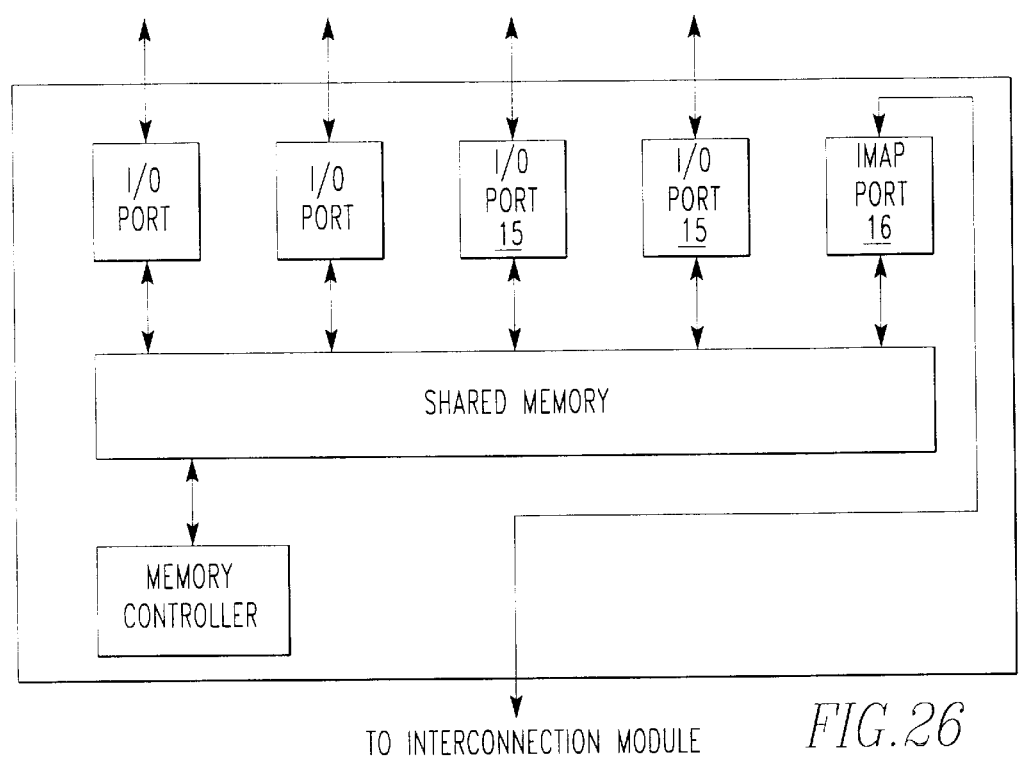
FIG. 26 is a schematic representation of a switching module based on shared memory switch architecture.

24. Users 42, which can be any PC or workstation or interactive television, etc., communicate with each other using ATM or packets. The users 42 are connected to respective switching modules 12 which are in turn connected to each other through the IMAP 14, as described above. Essentially, any switching techniques known in the art can be used as switching modules. Examples of the switching module are shown in FIGS. 27 and 28. Since the switching module has a small number of ports (i.e. 4×4 or 8×8), a bus based switch could be used as the switching module as shown in FIG. 25. Shared memory architecture, as well known in the art, can also be used as the switching module as shown in FIG. 26. I/O (Input Output) port handles the synchronization of incoming packets and transfers digital information to the transmission medium accordingly. Packet memory 36 is used as the packet buffer in the switching module 12. Control logic switches incoming packets to appropriate output ports according to previously discussed routing algorithms.

For general ATM discussion, see Martin De Prycker, "Asynchronous Transfer Mode solution for Broadband ISDN", Second Edition, Ellis Horwood Publisher, New York; CCITT Recommendation, I Series (B-ISDN), November 1990, all of which are incorporated by reference herein.

For ATM switching architecture discussion, see J. J. Degan, G. W. J. Luderer and A. K. Vaidya, "Fast Packet Technology for Future Switches", AT&T Technical Journal, Vol. 68, No. 2, pp. 36–51, March/April 1989; K. A. Lutz, Considerations on ATM Switching Techniques, International Journal of Digital and Analog Cabled Systems 1:237–243, 1988; F. Tobagi, "Fast packet architectures for broadband integrated services digital networks", Proceedings of the IEEE, Vol. 78, No. 1, pp. 133–167, January 1990; J. S. Turner, "Design of a Broadcast Packet Switching Network", In Proceedings of INFOCOM '86, pages 667–675, IEEE, March, 1986, all of which are incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch comprising:
   L switching modules which switch packets, where $L \geq 2$ and is an integer; and
   an interconnection module that provides a passive backplane which is connected to each of the L switching modules, said backplane providing space and time multiplexed connectivity between the L switching modules by the way the backplane is connected to the L switching modules and the way the interconnection module controls when packets pass through the interconnection module, said interconnection module reprogrammable in regard to space connectivity between the L switching modules by being changeable with respect to how the backplane connects with each of the L switching modules.

2. An apparatus as described in claim 1 wherein the interconnection module is scalable.

3. An apparatus as described in claim 2 wherein each switching module has m I/O ports for user connections, where $m \geq 2$ and is an integer and where each I/O port has a speed, and T interconnection module access ports for interconnection module connections, where $T \geq 2$ and is an integer.

4. An apparatus as described in claim 3 wherein each switching module has a buffer memory.

5. An apparatus as described in claim 4 wherein the buffer memory is comprised of an input buffer memory and an output buffer memory which are connected to the I/O ports and an interconnection module access port buffer memory connected to the interconnection module access ports.

6. An apparatus as described in claim 5 wherein the interconnection module access ports operate at a speed of S, where $S \geq$ Speed of each I/O port.

7. An apparatus as described in claim 6 wherein the interconnection module causes a packet to reach a desired I/O port in a maximum of $\log_T N$ hops.

8. An apparatus as described in claim 7 wherein the number of interconnection module access ports corresponds to how a packet is routed by the switching modules and interconnection module to a desired destination.

9. An apparatus as described in claim 7 wherein the switching modules includes a fair queue.

10. An apparatus as described in claim 7 wherein the switching modules and interconnection module operates in modulo T.

11. An apparatus as described in claim 1 including an I/O packet processor which synchronizes and checks for errors in incoming packets, said I/O packet processor connected to each switching module.

12. An apparatus as described in claim 11 including a switch controller which establish connectivity in at least one switching module so a packet can reach a desired destination.

13. An apparatus as described in claim 12 wherein each switching module has a routing table which provides logical channel translation such that a destination address of a packet is decoded so connectivity can be properly established in the switching module.

14. An apparatus as described in claim 13 wherein each switching module has a packet memory for buffering packets.

15. An apparatus as described in claim 14 wherein each switching module and the interconnection module multicast packets.

16. A switch comprising:
   L switching modules which switch packets, where $L \geq 2$ and is an integer, each of the L switching modules switching packets independent of any other switching module such that there is distributed switching of packets across the L switching modules; and
   an interconnection module that provides a passive backplane which is connected to each of the L switching modules, said backplane providing connectivity between the L switching modules, said backplane of the interconnection module expandable in regard to space connectivity between the L switching modules without a priori knowledge of a final number of switch modules.

17. A method for creating a switch comprising the steps of:
   connecting a first and at least a second switching module to a passive backplane of an interconnection module;
   progranmning the interconnection module to create a desired connectivity between the first and second switching modules through the backplane of the interconnection module;
   transferring a packet through the backplane interconnection module and first and second switching modules;
   connecting at least one additional switching module to the backplane of the interconnection module; and reprogramming the interconnection module to create a desired connectivity between the first, second and third switching modules through the backplane of the interconnection module.

18. A method of directing a packet comprising the steps of:

inputting a packet having a destination address and a counter bit into a first switching module;

checking whether the first switching module has the destination address of the packet;

reading the counter bit;

reading the ith bit of the destination decision code, said ith bit corresponding to the counter bit, $i \geq 1$ and is an integer;

sending the packet out a port of the switching module whose value corresponds to the value of the ith bit;

transferring the packet to a second switching module through an interconnection module;

incrementing the counter bit by 1; and searching for the destination address until it is found.

19. A method of directing a packet comprising the steps of:

inputting a packet having a plurality of destination addresses defined by address bits, a counter bit, and a decision code into a first switching module;

checking whether the first switch has any of the destination addresses of the packet;

reading the counter bit;

reading the ith bit of the destination addresses, said ith bit corresponding to the counter bit, $i \geq 1$ and is an integer;

setting the decision code of the cell to correspond to the ith bit of the destination addresses bits;

sending the packet out each port of the switching module whose value corresponds to the decision code;

transferring the packet to a second switching module through an interconnection module;

incrementing the counter bit by 1;

checking whether any of the destination addresses of the packet are at the second switching module;

reading the counter bit;

reading the ith+1 bit of the destination addresses bits;

setting the decision code of the cell to correspond to the ith+1 bit of the destination addresses bits; and searching for the destination addresses until they are found.

* * * * *